US009301163B2

(12) United States Patent
Salhab et al.

(10) Patent No.: US 9,301,163 B2
(45) Date of Patent: Mar. 29, 2016

(54) AMPLIFY AND FORWARD RELAY METHOD

(71) Applicant: KING FAHD UNIVERSITY OF PETROLEUM AND MINERALS, Dhahran (SA)

(72) Inventors: Anas M.A. Ata Salhab, Dhahran (SA); Salam Adel Zummo, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 283 days.

(21) Appl. No.: 14/022,185

(22) Filed: Sep. 9, 2013

(65) Prior Publication Data

US 2015/0071161 A1    Mar. 12, 2015

(51) Int. Cl.
*H04B 7/14* (2006.01)
*H04W 24/02* (2009.01)
*H04B 7/155* (2006.01)

(52) U.S. Cl.
CPC ........... *H04W 24/02* (2013.01); *H04B 7/15528* (2013.01); *H04B 7/15557* (2013.01); *H04B 7/15592* (2013.01)

(58) Field of Classification Search
CPC ....... H04J 3/14; H04L 5/0046; H04L 5/0058; H04B 7/15528; H04B 7/15557
USPC .......... 370/251, 315, 328, 429, 241, 351, 332
See application file for complete search history.

(56) References Cited

U.S. PATENT DOCUMENTS

| 7,593,342 B2 | 9/2009 | Molisch et al. |
| 7,933,549 B2 * | 4/2011 | Larsson ............................ 455/7 |
| 8,169,919 B2 * | 5/2012 | Suh et al. ...................... 370/241 |
| 8,331,280 B2 * | 12/2012 | Hottinen et al. .............. 370/315 |
| 8,432,848 B2 * | 4/2013 | Mehta ................ H04B 7/15592 370/315 |
| 2007/0217432 A1 * | 9/2007 | Molisch ................ H04B 7/026 370/400 |
| 2009/0005104 A1 * | 1/2009 | Wang et al. .................... 455/522 |
| 2009/0017753 A1 * | 1/2009 | Kim et al. ........................ 455/10 |
| 2009/0116419 A1 | 5/2009 | Chong et al. |
| 2010/0091697 A1 | 4/2010 | Vucetic et al. |
| 2011/0273981 A1 | 11/2011 | Ktenas et al. |
| 2012/0108164 A1 * | 5/2012 | Yuda et al. ........................ 455/9 |

OTHER PUBLICATIONS

Kyu-Sung Hwang and Young-Chai Ko, "An Efficient Relay Selection Algorithm for Cooperative Networks", Vehicular Technology Conference, 2007. VTC-2007 Fall. 2007 IEEE 66th, Sep. 30, 2007-Oct. 3, 2007, pp. 81-85.
Viet-Anh Le, Renaud-Alexandre Pitaval, Steven Blostein, Taneli Riihonen and Risto Wichman, "Green Cooperative Communication Using Threshold-Based Relay Selection Protocols", 2010 International Conference on Green Circuits and Systems (ICGCS), Jun. 21-23, 2010, pp. 521-526.

* cited by examiner

*Primary Examiner* — Ricky Ngo
*Assistant Examiner* — Dewanda Samuel
(74) *Attorney, Agent, or Firm* — Richard C. Litman

(57) ABSTRACT

The amplify and forward relay method enhances QOS in wireless networks and is based on the switch-and-examine (SEC) and SEC post-selection (SECps) diversity combining techniques where only a single relay out of multiple relays is used to forward the source signal to the destination. The selection process is performed based on a predetermined switching threshold. Maximal-ratio combining (MRC) is used at the destination to combine the signal on the relay path with that on the direct link.

2 Claims, 3 Drawing Sheets

AMPLIFY AND FORWARD RELAY METHOD

BACKGROUND OF THE INVENTION

1. Field of the Invention

The present invention relates to a data communication network supporting mobile devices, and particularly to an amplify and forward relay method that provides reliable data transmission in such a data communication network using relay stations.

2. Description of the Related Art

In wireless applications, users may not be able to support multiple antennas due to size, complexity, and power limitations. Cooperative diversity is a promising solution for such a condition. Among the known relaying schemes are the amplify-and-forward (AF) and the decode-and-forward (DF). In the AF scheme, the relay simply amplifies the source signal before forwarding it to the destination. In the DF scheme, some signal processing needs to be performed before the signal is forwarded. In systems where multiple relays are used, efficient relaying protocols, e.g., fixed, selection, and incremental relaying, have been proposed. In fixed relaying, a set of relays is used to forward the source signal to the destination. In selection relaying, a relay or a number of relays is selected to cooperate according to the conditions of their channels. Finally, in incremental relaying, a relay or a set of relays is asked to cooperate based on a feedback signal from the destination if the direct link channel is under a certain threshold.

Other technologies include user cooperation in a coded cooperative system, where convolutional codes are used in a Rayleigh fading environment with path loss effect. Opportunistic relaying is a scheme in which the relay with the strongest end-to-end (e2e) signal-to-noise ratio (SNR) is selected to cooperate with the source. Hence, the channels of all relays need to be estimated each time in order to select the best relay among all relays. A study on centralized selection relaying has been presented in which all channel gains are assumed to be available at the destination node in order to select the best relay among all relays. Additionally, a known partial relay selection scheme for AF (amplify-and-forward) relay networks provides a relay selection algorithm where the relay with the SNR that is greater than a predetermined SNR threshold and is the maximum among other relays is chosen to be the best. In another selection relaying method, the protocol selects the second or even the $N^{th}$ best relay with the highest end-to-end (e2e) SNR in the case when the first best relay is involved in some scheduling or load balancing schemes. Other schemes include the one where the relay with the best minimum of the two hop channels is selected as the best, and another one where the relay with the best value of a modified expression of the harmonic mean is selected to cooperate with the source.

In relay selection schemes for channel state information (CSI)-assisted dual-hop AF relay networks over Nakagami-m fading channels, the key idea is that the selection criterion is based on the channel magnitudes and not the channel SNRs, which is an attempt to reduce the system complexity. In incremental opportunistic relaying, the best relay is asked to cooperate if the direct link channel is below a predetermined SNR threshold. Additionally, energy-fair decentralized relay selection techniques in wireless sensor networks whose nodes are uniformly distributed according to a two-dimensional homogeneous Poisson process have been developed. These schemes take the network topological structure into consideration. Other researchers have proposed a relay selection scheme for half-duplex relays with buffers. This protocol guarantees that each time, the best first hop and second hops links are involved in the data transmission.

As can be seen, most of the aforementioned methods suffer from a heavy estimation load. As an example, in the best relay selection scheme, all channels of all relays need to be estimated each transmission time. On the other hand, in the partial relaying protocol, half this estimation load is required each time. This means more power consumption, low battery life, and high system complexity. In most wireless networks, once the minimum system requirement is achieved, no more operations that increase the system complexity need to be done. This finds its practicality in both sensor and ad-hoc networks.

Thus, an amplify and forward relay method solving the aforementioned problems is desired.

SUMMARY OF THE INVENTION

The amplify and forward relay method enhances quality of service (QOS) in wireless networks and is based on the switch-and-examine (SEC) and SEC post-selection (SECps) diversity combining technique where only a selected relay out of multiple relays is used to forward the source signal to the destination. The selection process is performed based on a predetermined switching threshold. Maximal-ratio combining (MRC) is used at the destination to combine the signal on the relay path with that on the direct link.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
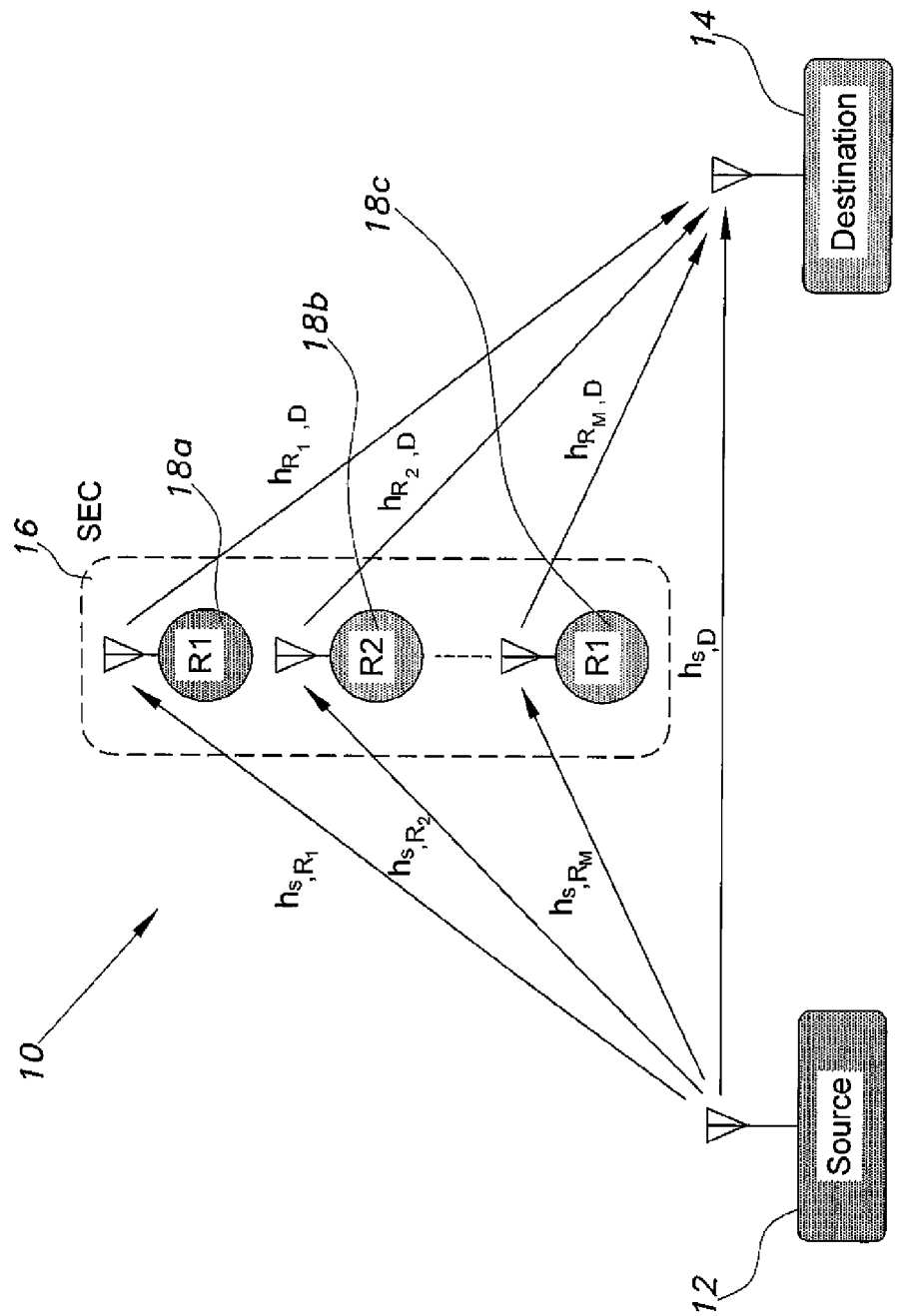
FIG. 1 is a block diagram of an embodiment of an amplify and forward relay method according to the present invention, illustrating a dual hop AF relay system.

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The amplify and forward relay method enhances QOS in wireless networks and is based on the switch-and-examine (SEC) and SEC post-selection (SECps) diversity combining technique where only a selected relay out of multiple relays is used to forward the source signal to the destination. The selection process is performed based on a predetermined switching threshold. Maximal-ratio combining (MRC) is used at the destination to combine the signal on the relay path with that on the direct link. The method can be implemented in both the downlink and uplink channels. The present method selects the switching threshold to minimize the error probability of the system. The direct link between the source and the destination has an important role in wireless systems and is utilized in the present method. The threshold in the present method is a signal-to-noise ratio (SNR) and is most appropriately related to circuit switching mode relay networks. Thus, the present method is a channel-state-information (CSI)-assisted AF relay selection scheme. Moreover, in the present relay selection scheme, the relay's two hop channels are considered in the selection process, and not just the channels of one hop.

Only one relay is selected to forward the source signal to the destination according to a certain predetermined switching threshold. The switching threshold is evaluated to minimize the error rate, and thus fulfills certain performance requirements. In contrast to the aforementioned relay selection schemes, the proposed scheme reduces the number of channel estimations, and thus the system complexity. In the present protocol, the channels of only an arbitrary relay are required to be estimated each time of data transmission. In this case, the other relays remain silent and do not need to operate as channel estimators. This saves the power of these nodes, as well as their battery life. A moment-generating function (MGF) of the SNR at the output of the selection scheme is derived. Then, we evaluate the CDF, and hence the outage probability of the end-to-end (e2e) SNR at the output of the MRC combiner. Finally, we evaluate an expression for the BER (bit error rate) of the whole system. An upper bound on the e2e SNR is used in the analysis, and both independent identical distributed (i.i.d.) and independent non-identical distributed (i.n.d.) relay paths are considered.

In the SEC selection relaying system 10, shown in FIG. 1, a source node 12 communicates with a destination node 14 through the direct link and a relay path. At the guard period of each transmission, a ready-to-send (RTS) packet and a clear-to-send (CTS) packet are sent from the source and the destination, respectively. From these signals, an arbitrary relay out of M relays, 18a, 18b, 18c estimates its instantaneous channels. Then, the minimum magnitude of the two hops is compared with a predetermined switching threshold. If this minimum magnitude is larger than the switching threshold, then this relay is selected to forward the source signal, and a short duration flag packet is sent from this relay to the other relays, signaling its presence. Otherwise, a flag packet is sent from this relay to another relay asking it to estimate its channels, which is then to be compared with the switching threshold. This process continues until a relay satisfying the switching threshold is found, or until reaching the last relay. In this case, the last relay is chosen to forward the source signal. As an enhancement on the SEC relaying, the present method utilizes an SECps relaying scheme, where for the case in which the last relay is reached and found unacceptable, the SECps scheme goes and selects the best relay among all relays.

Figure 2:
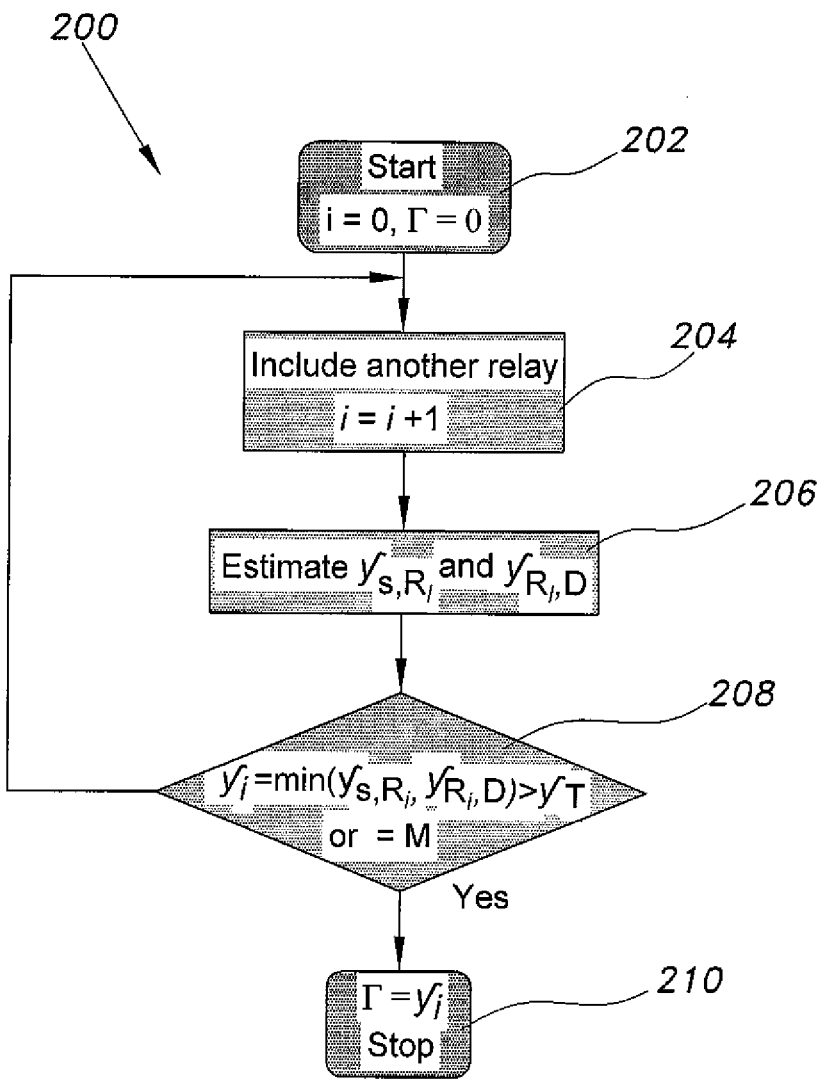
FIG. 2 is a flowchart of an embodiment of an amplify and forward relay method according to the present invention, illustrating the SEC relaying method.
Figure 3:
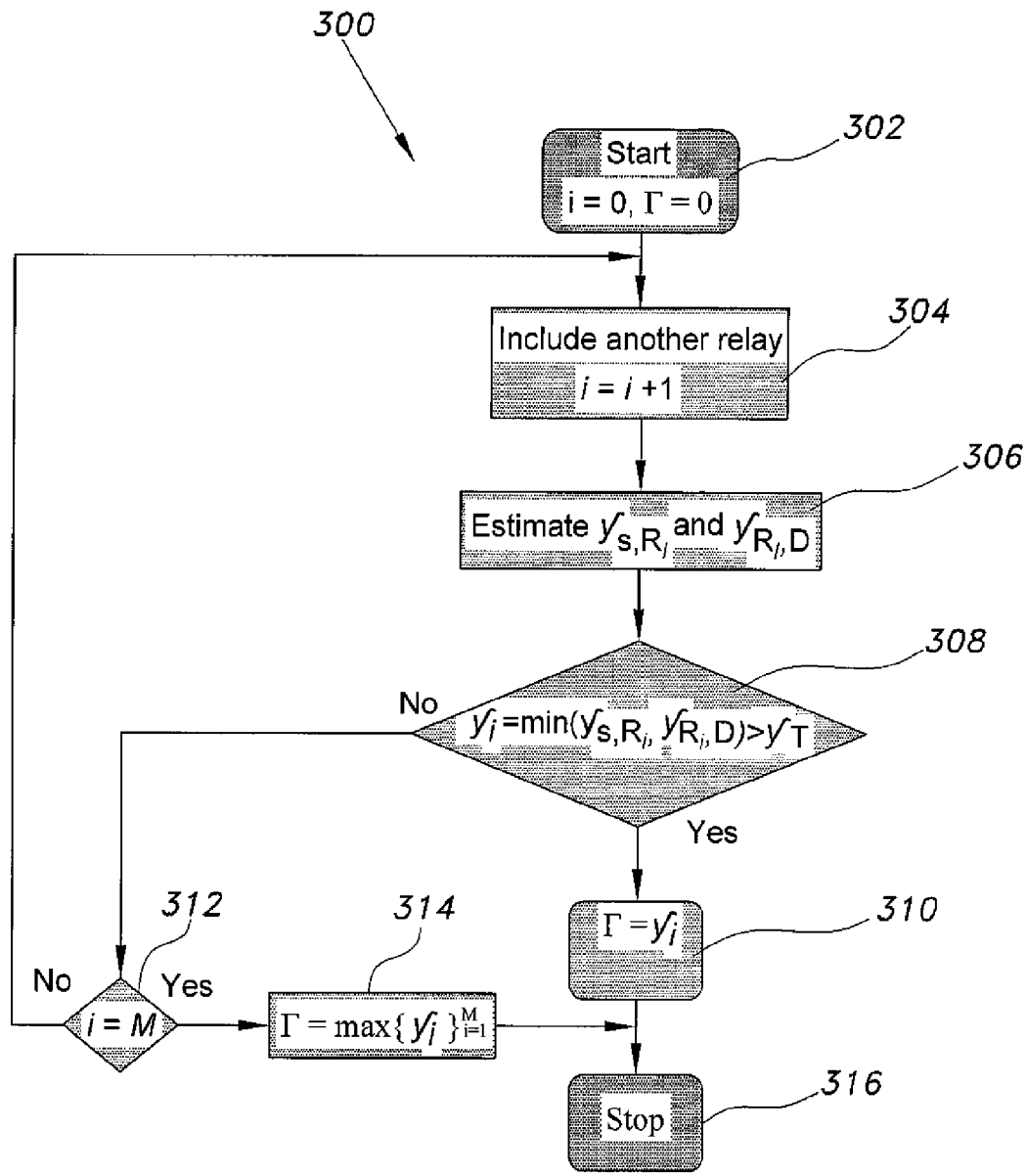
FIG. 3 is a flowchart of an embodiment of an amplify and forward relay method according to the present invention, illustrating the SECps relaying method.

Usually, in practical applications, the predetermined switching threshold is chosen in order to satisfy certain performance requirements in terms of the outage probability or error probability. In our proposed scheme, the SNRs of both the first hop and the second hop channels of the selected relay are required at the destination node. These SNR values, along with the direct link SNR, are then used in calculating the switching threshold in such a way that the end-to-end (e2e) bit error probability (BEP) is minimized. The flowcharts of the present SEC and SECps relaying schemes are shown in FIGS. 2 and 3, respectively. As shown in FIG. 2, the present SEC method 200 includes a starting step 202 that initializes i and $\Gamma$. Another of the relays, shown in FIG. 1, is included at step 204. Then, at step 206, $y_{S,R_i}$ and $y_{R_i,D}$ are estimated. At step 208, a check is performed to determine if $\gamma_i = \min(\gamma_{S,R_i}, \gamma_{R_i,D}) > \gamma_T)$ or i=M, and if those conditions are not met, then the process iterates through steps 204, 206, and 208. Otherwise, $\Gamma$ is set to $\gamma_i$ at step 210, and the SEC procedure is terminated. The SEC post-selection (SECps) method 300, shown in FIG. 3 starts by initializing i and $\Gamma$ at step 302. At step 304 another of the relays, shown in FIG. 1, is included. At step 306, $y_{S,R_i}$ and $y_{R_i,D}$ are estimated. At step 308 a check is performed to determine if $\gamma_i = \min(\gamma_{S,R_i}, \gamma_{R_i,D}) > \gamma_T)$. If true, then $\Gamma$ is set to $\gamma_i$ at step 310, and the SEC procedure is terminated at step 316. If not true, then at step 312, a check is performed to determine whether i=M. If i=M, then at step 314, $\Gamma$ is set to $\max\{\gamma_i\}_{i=1}^M$ and the SECps procedure terminates at step 316. On the other hand, if at step 312 i≠M, then the procedure iterates beginning at step 304 until the stopping criterion is reached at step 316.

At the destination, MRC (maximal ratio combining) is used to combine the signal on the direct path and that through the relay. The channel coefficients between the source and the $i^{th}$ relay Ri($h_{S,Ri}$), between Ri and D ($h_{Ri,D}$) and between S and D ($h_{S,D}$) are assumed to be flat Rayleigh fading gains. In addition, $h_{S,Ri}$, $h_{Ri,D}$, and $h_{S,D}$ are mutually-independent and non-identical. We also assume here, without any loss of generality, that the additive white Gaussian noise (AWGN) terms of all links have zero means and equal variance $N_0/2$.

Communications occur in two phases. In phase 1, the source transmits the modulated signal x with unit energy to the destination and the two relays. The received signals at the destination and the $i^{th}$ relay, respectively, satisfy the equations:

$$y_{S,D} = h_{S,D}\sqrt{E_S}s + n_{S,D} \quad (1)$$

$$y_{S,R_i} = h_{S,R_i}\sqrt{E_S}s + n_{S,R_i} \quad (2)$$

where Es is the average symbol energy, and $n_{S,D}$ and $n_{S,R_i}$ are the AWGN between S and D and S and $R_i$, respectively. The relay chosen by the SEC method 200 amplifies the received signal and transmits it to the destination in the second phase of communication. During this phase, the received signal at the destination from the selected relay is:

$$y_{R_{sel},D} = Gh_{R_{sel},D}\sqrt{E_S}s + n_{R_{sel},D} \quad (3)$$

where G is the active relay amplifying gain, chosen as $G^2 = E_S/(E_S h_{S,R_{sel}}^2 + N_0)$. It is widely known that the composite SNR of the relay link can be written as:

$$\gamma_{S,R_i,D} = \frac{\gamma_{S,R_i}\gamma_{R_i,D}}{\gamma_{S,R_i} + \gamma_{R_i,D} + 1} \quad (4)$$

where $\gamma_{S,R_i} = h_{S,R_i}^2 E_S/N_0$ is the instantaneous SNR of the source signal at Ri and $\gamma_{R_i,D} = h_{R_i,D}^2 E_S/N_0$ is the instantaneous SNR of the relay signal (by Ri) at D. By using Maximal-ratio combining (MRC) at the destination node, the total SNR at the combiner output is simply the addition of the two random variables at its inputs as follows:

$$\gamma_{tot} = \gamma_{S,D} + \gamma_{SEC} \quad (5)$$

where $\gamma_{S,D} = h_{S,D}^2 E_S/N_0$ is the instantaneous SNR between S and D, and $\gamma_{SEC}$ is the SNR at the output of the SEC selection scheme. To simplify the ensuing derivations, equation (4) should be expressed in a more mathematically tractable form. A tighter upper bound for $\gamma_{S,R_i,D}$ is given in by:

$$\gamma_{S,R_i,D} \leq \gamma_i = \min(\gamma_{S,R_i,D}, \gamma_{R_i,D}) \qquad (6)$$

Assuming Rayleigh fading channels between source, relays, and destination, the distribution of $\gamma_i$ in equation (6) is exponential, and hence its PDF can be expressed in terms of the average SNR $\bar{\gamma}_{S,R_i} = E[h_{S,R_i}^2]E_S/N_0$ and $\bar{\gamma}_{R_i,D} = E[h_{R_i,D}^2]E_S/N_0$ (where $E[.]$ is the expectation operator) as:

$$f_{\gamma_i}(\gamma) = \frac{1}{\bar{\gamma}_i}\exp\left(-\frac{\gamma}{\bar{\gamma}_i}\right) \qquad (7)$$

where $\bar{\gamma}_i = \bar{\gamma}_{S,R_i}\bar{\gamma}_{R_i,D}/(\bar{\gamma}_{S,R_i}+\bar{\gamma}_{R_i,D})$. Subsequent analysis is based on the SNR bound given in equation (6) on the e2e SNR of the selection scheme.

With respect to the outage probability, for independent identical distributed (i.i.d.) relay paths, the cumulative distribution function (CDF) of $\gamma_{SEC}$ can be written as:

$$F_{\gamma SEC}(\gamma) = \begin{cases} [F_\gamma(\gamma_T)]^{M-1}F_\gamma(\gamma), & \gamma < \gamma_T; \\ \sum_{j=0}^{M-1}[F_\gamma(\gamma)-F_\gamma(\gamma_T)][F_\gamma(\gamma_T)]^j + [F_\gamma(\gamma_T)]^M, & \gamma \geq \gamma_T \end{cases} \qquad (8)$$

where M is the number of relays and $\gamma_T$ is the predetermined switching threshold. The CDF of the $i^{th}$ relay path can be found as:

$$F_{\gamma_i}(\gamma) = 1 - \exp\left(-\frac{\gamma}{\bar{\gamma}_i}\right) \qquad (9)$$

where $\gamma_i$ is as defined before. Differentiating (9) with respect to $\gamma$, and after some simple manipulations, the moment-generating function (MGF) of $\gamma_{SEC}$ can be found as:

$$M_{\gamma_{SEC}}(s) = (1-\bar{\gamma}s)^{-1} \qquad (10)$$

$$\left[\left(1-\exp\left(-\frac{\gamma_T}{\bar{\gamma}}\right)\right)^{M-1} + \exp\left(-\left(\frac{\gamma_T}{\bar{\gamma}}-\gamma T^s\right)\right)\times\sum_{j=0}^{M-2}\left(1-\exp\left(-\frac{\gamma_T}{\bar{\gamma}}\right)\right)^j\right]$$

where we have assumed i.i.d. symmetrical hops, i.e., $\bar{\gamma}_{S,R_i} = \bar{\gamma}_{R_i,D} = \bar{\gamma}$, $\forall i, i \in \{1, \ldots, M\}$ in the last result. Using Maximal-ratio combining (MRC) at the destination, the MGF of the total SNR is given by:

$$M_{\gamma_{tot}}(s) = M_{\gamma_{S,D}}(s)M_{\gamma_{SEC}}(s). \qquad (11)$$

Using partial fractions, the last result of the MGF of the total SNR can be found as:

$$M_{\gamma_{tot}}(s) = \left(1-\exp\left(-\frac{2\gamma_T}{\bar{\gamma}}\right)\right)^{M-1}\left[\frac{(1-\bar{\gamma}_{S,D}^s)^{-1}}{\left(1-\frac{\bar{\gamma}}{\bar{\gamma}_{S,D}}\right)} + \frac{(1-\bar{\gamma}_s)^{-1}}{\left(1-\frac{\bar{\gamma}_{S,D}}{\bar{\gamma}}\right)}\right] + \qquad (12)$$

$$\exp\left(-\frac{\gamma_T}{\bar{\gamma}}\right)\times\sum_{j=0}^{M-2}\left(1-\exp\left(-\frac{\gamma_T}{\bar{\gamma}}\right)\right)^j$$

$$\left[\frac{(1-\bar{\gamma}_{S,D}^s)^{-1}\exp(\gamma T^s)}{\left(1-\frac{\bar{\gamma}}{\bar{\gamma}_{S,D}}\right)} + \frac{(1-\bar{\gamma}_s)^{-1}\exp(\gamma T^s)}{\left(1-\frac{\bar{\gamma}_{S,D}}{\bar{\gamma}}\right)}\right].$$

Taking the inverse Laplace transform of equation (12), after some simple steps, yields:

$$P_{out} = \frac{1}{(\bar{\gamma}-\bar{\gamma}_{S,D})}\left\{\left(1-\exp\left(-\frac{\gamma_T}{\bar{\gamma}}\right)\right)^{M-1}\right. \qquad (13)$$

$$\left[\bar{\gamma}\left(1-\exp\left(-\frac{\gamma_{th}}{\bar{\gamma}}\right)\right)-\bar{\gamma}_{S,D}\left(1-\exp\left(-\frac{\gamma_{th}}{\bar{\gamma}_{S,D}}\right)\right)\right]\times$$

$$\sum_{j=0}^{M-2}\left(1-\exp\left(-\frac{\gamma_T}{\bar{\gamma}}\right)\right)^j\left[\bar{\gamma}\left\{\exp\left(-\frac{\gamma_T}{\bar{\gamma}}\right)-\exp\left(-\frac{\gamma_{th}}{\bar{\gamma}}\right)\right\}-\right.$$

$$\bar{\gamma}_{S,D}\exp\left(\left(-\frac{1}{\bar{\gamma}}+\frac{1}{\bar{\gamma}_{S,D}}\right)\gamma_T\right)\times$$

$$\left.\left.\left\{\exp\left(-\frac{\gamma_T}{\bar{\gamma}_{S,D}}\right)-\exp\left(-\frac{\gamma_{th}}{\bar{\gamma}_{S,D}}\right)\right\}\right]\right\}.$$

For the i.n.d. case, the CDF of $\gamma_{SEC}$ can be written as:

$$F_{\gamma_{SEC}}(\gamma) = \begin{cases} \sum_{i=0}^{M-1}\pi_i F_{\gamma_i}(\gamma)\prod_{\substack{k=0\\k\neq i}}^{M-1}F_{\gamma_k}(\gamma_T), \gamma < \gamma_T \\ \sum_{i=0}^{M-1}\left(\pi_i\prod_{k=1}^{M}F_{\gamma_k}(\gamma_T) + \sum_{j=0}^{M-1}\pi_{((i-j))M}[F_{\gamma_i}(\gamma)-F_{\gamma_i}(\gamma_T)]\times\prod_{k=0}^{j-1}F_{\gamma((i-j+k))M}(\gamma_T)\right), \gamma \geq \gamma_T, \end{cases} \qquad (14)$$

where $\pi_i$, $0, \ldots, M-1$ are the stationary distribution of an M-state Markov chain, and it is the probability that the $i^{th}$ relay is chosen, $F_{\gamma_i}(\gamma)$ is the CDF of signal power of the $i^{th}$ relay path, and $((i-j))_M$ denotes i-j modulo M. Following the same procedure as in the i.i.d. fading channels yields:

$$P_{out} = \sum_{i=0}^{M-1}\pi_i\prod_{\substack{k=0\\k\neq i}}^{M-1}\left(1-\exp\left(\frac{\gamma_T}{\bar{\gamma}_k}\right)\right) \qquad (15)$$

$$\left[\frac{\left(1-\exp\left(-\frac{\gamma_{th}}{\bar{\gamma}_{S,D}}\right)\right)}{\left(1-\frac{\bar{\gamma}_i}{\bar{\gamma}_{S,D}}\right)}+\frac{\left(1-\exp\left(-\frac{\gamma_{th}}{\bar{\gamma}}\right)\right)}{\left(1-\frac{\bar{\gamma}_{S,D}}{\bar{\gamma}_i}\right)}-\exp\left(-\frac{\gamma_T}{\bar{\gamma}_i}\right)\right]$$

$$+\left\{\frac{\exp\left(-\frac{\gamma_T}{\bar{\gamma}_{S,D}}\right)}{\left(1-\frac{\bar{\gamma}_i}{\bar{\gamma}_{S,D}}\right)}\times\left(\exp\left(-\frac{\gamma_T}{\bar{\gamma}_{S,D}}\right)-\exp\left(-\frac{\gamma_{th}}{\bar{\gamma}_{S,D}}\right)\right)\right\}$$

$$\sum_{j=0}^{M-1}\pi_{((i-j))_M}\times\prod_{k=0}^{j-1}\left(1-\exp\left(-\frac{\gamma_T}{\bar{\gamma}_{((i-j+k))_M}}\right)\right)$$

$$\left[\exp\left(-\frac{\gamma_{th}}{\bar{\gamma}_i}\right)\right]\left\{\begin{array}{c}\frac{\exp\left(\frac{\gamma_T}{\bar{\gamma}_{S,D}}\right)}{\left(1-\frac{\bar{\gamma}_i}{\bar{\gamma}_{S,D}}\right)}\left(1-\exp\left(-\frac{\gamma_{th}}{\bar{\gamma}_{S,D}}\right)\right)+\\ \frac{\exp\left(\frac{\gamma_T}{\bar{\gamma}_i}\right)}{\left(1-\frac{\bar{\gamma}_{S,D}}{\bar{\gamma}_i}\right)}\times\left(1-\exp\left(-\frac{\gamma_{th}}{\bar{\gamma}_i}\right)\right)\end{array}\right\}$$

With respect to bit error probability (BEP), the average BEP for Binary phase-shift keying (BPSK) signals in terms of the moment-generating function is given by:

$$P_b(E)=\frac{1}{\pi}\int_0^{\pi/2}M_{\gamma_{tot}}\left(-\frac{1}{\sin^2\phi}\right)d\phi. \tag{16}$$

Substituting (15) in (16) yields:

$$P_b(E)= \tag{17}$$

$$\left(1-\exp\left(-\frac{\gamma_T}{\bar{\gamma}}\right)\right)^{M-1}\left[\frac{1}{\left(1-\frac{\bar{\gamma}}{\bar{\gamma}_{S,D}}\right)}I_1+\frac{1}{\left(1-\frac{\bar{\gamma}_{S,D}}{\bar{\gamma}}\right)}\times I_2\right]+\exp\left(-\frac{\gamma_T}{\bar{\gamma}}\right)$$

$$\sum_{j=0}^{M-2}\left(1-\exp\left(-\frac{\gamma_T}{\bar{\gamma}}\right)\right)^j\times\left[\frac{1}{\left(1-\frac{\bar{\gamma}}{\bar{\gamma}_{S,D}}\right)}\times I_3+\frac{1}{\left(1-\frac{\bar{\gamma}_{S,D}}{\bar{\gamma}}\right)}I_4\right]$$

where:

$$I_1=\frac{1}{\pi}\int_0^{\pi/2}\frac{\sin^2\phi}{\sin^2\phi+\bar{\gamma}_{S,D}}d\phi$$

$$I_2=\frac{1}{\pi}\int_0^{\pi/2}\frac{\sin^2\phi}{\sin^2\phi+\bar{\gamma}}d\phi$$

$$I_3=\frac{1}{\pi}\int_0^{\pi/2}\frac{\sin^2\phi\exp\left(-\frac{\gamma_T}{\sin^2\phi}\right)}{\sin^2\phi+\bar{\gamma}_{S,D}}d\phi$$

$$I_4=\frac{1}{\pi}\int_0^{\pi/2}\frac{\sin^2\phi\exp\left(-\frac{\gamma_T}{\sin^2\phi}\right)}{\sin^2\phi+\bar{\gamma}}d\phi.$$

The integrals $I_1$ and $I_2$ can be solved, and the integrations $I_3$ and $I_4$ can be solved. After some algebraic manipulations, the last result of the bit error rate appears as:

$$P_b(E)=\left(1-\exp\left(-\frac{\gamma_T}{\bar{\gamma}}\right)\right)^{M-1} \tag{18}$$

$$\left[\frac{1}{\left(1-\frac{\bar{\gamma}}{\bar{\gamma}_{S,D}}\right)}\left(1-\sqrt{\frac{\bar{\gamma}_{S,D}}{1+\bar{\gamma}_{S,D}}}\right)+\frac{1}{\left(1-\frac{\bar{\gamma}_{S,D}}{\bar{\gamma}}\right)}\left(1-\sqrt{\frac{\bar{\gamma}}{1+\bar{\gamma}}}\right)\right]+$$

$$\exp\left(-\frac{\gamma_T}{\bar{\gamma}}\right)\sum_{j=0}^{M-2}\left(1-\exp\left(-\frac{\gamma_T}{\bar{\gamma}}\right)\right)^j\left\{\frac{1}{\left(1-\frac{\bar{\gamma}}{\bar{\gamma}_{S,D}}\right)}\left[Q(\sqrt{2\gamma_T})-\right.\right.$$

$$\left.\frac{\exp\left(\frac{\gamma_T}{\bar{\gamma}_{S,D}}\right)}{\sqrt{1+\frac{1}{\bar{\gamma}_{S,D}}}}\times Q\left(\sqrt{2\gamma_T+\frac{2\gamma_T}{\bar{\gamma}_{S,D}}}\right)\right]+\frac{1}{\left(1-\frac{\bar{\gamma}_{S,D}}{\bar{\gamma}}\right)}$$

$$\left.\left[Q(\sqrt{2\gamma_T})-\frac{\exp\left(\frac{\gamma_T}{\bar{\gamma}}\right)}{\sqrt{1+\frac{1}{\bar{\gamma}}}}Q\left(\sqrt{2\gamma_T+\frac{2\gamma_T}{\bar{\gamma}}}\right)\right]\right\},$$

where $Q(.)$ is the Gaussian Q-function. For the i.n.d. relay paths, and upon substituting the MGF of $\gamma_{tot}$ for this case in equation (16), and following the same procedure as in the i.i.d. case, a closed-form expression for the BEP can be evaluated as:

$$P_b(E)=\sum_{i=0}^{M-1}\pi_i \tag{19}$$

$$\prod_{\substack{k=0\\k\neq i}}^{M-1}\left(1-\exp\left(-\frac{\gamma_T}{\bar{\gamma}_k}\right)\right)\left[\frac{\left(1-\sqrt{\frac{\bar{\gamma}_{S,D}}{1+\bar{\gamma}_{S,D}}}\right)}{2\left(1-\frac{\bar{\gamma}_i}{\bar{\gamma}_{S,D}}\right)}+\frac{\left(1-\sqrt{\frac{\bar{\gamma}_i}{1+\bar{\gamma}_i}}\right)}{2\left(1-\frac{\bar{\gamma}_{S,D}}{\bar{\gamma}_i}\right)}-\right.$$

$$\frac{\exp\left(-\frac{\gamma_T}{\bar{\gamma}_i}\right)}{\left(1-\frac{\bar{\gamma}_T}{\bar{\gamma}_{S,D}}\right)}\left\{Q(\sqrt{2\gamma_T})-\right.$$

$$\left.\frac{\exp\left(\frac{\gamma_T}{\bar{\gamma}_{S,D}}\right)Q\left(\sqrt{2\left(\gamma_T+\frac{\gamma_T}{\bar{\gamma}_{S,D}}\right)}\right)}{\sqrt{1+\frac{1}{\bar{\gamma}_{S,D}}}}\right\}-\frac{\exp\left(-\frac{\gamma_T}{\bar{\gamma}_i}\right)}{\left(1-\frac{\bar{\gamma}_{S,D}}{\bar{\gamma}_i}\right)}$$

-continued $$\left\{Q(\sqrt{2\gamma_T}) - \frac{\exp\left(\frac{\gamma_T}{\overline{\gamma}_i}\right)Q\left(\sqrt{2\left(\gamma_T + \frac{\gamma_T}{\overline{\gamma}_i}\right)}\right)}{\sqrt{1+\frac{1}{\overline{\gamma}_i}}}\right\}\right] +$$

$$\sum_{i=0}^{M-1}\sum_{j=0}^{M-1} \pi_{((i-j))_M} \prod_{k=0}^{j-1}\left(1 - \exp\left(-\frac{\gamma_T}{\overline{\gamma}_{((i-j+k))_M}}\right)\right)$$

$$\left[\frac{\exp\left(-\frac{\gamma_T}{\overline{\gamma}_i}\right)}{\left(1 - \frac{\overline{\gamma}_i}{\overline{\gamma}_{S,D}}\right)}\right]\left\{Q(\sqrt{2\gamma_T}) - \frac{\exp\left(\frac{\gamma_T}{\overline{\gamma}_{S,D}}\right)}{\sqrt{1+\frac{1}{\overline{\gamma}_{S,D}}}} \times\right.$$

$$\left.Q\left(\sqrt{2\left(\gamma_T + \frac{\gamma_T}{\overline{\gamma}_{S,D}}\right)}\right)\right\} +$$

$$\frac{\exp\left(-\frac{\gamma_T}{\overline{\gamma}_i}\right)}{\left(1 - \frac{\overline{\gamma}_{S,D}}{\overline{\gamma}_i}\right)}\left\{Q(\sqrt{2\gamma_T}) - \right.$$

$$\left.\left.\frac{\exp\left(\frac{\gamma_T}{\overline{\gamma}_i}\right)Q\left(\sqrt{2\left(\gamma_T + \frac{\gamma_T}{\overline{\gamma}_i}\right)}\right)}{\sqrt{1+\frac{1}{\overline{\gamma}_i}}}\right\}\right].$$

Regarding SECps selection relaying, for the i.i.d. case, the CDF of $\gamma_{SECps}$ can be written as:

$$F_{\gamma_{SECps}}(\gamma) = \begin{cases} 1 - \sum_{j=0}^{M-1}[F_\gamma(\gamma_T)]^j[1 - F_\gamma(\gamma)], & \gamma < \gamma_T; \\ [F_\gamma(\gamma)]^M, & \gamma \geq \gamma_T \end{cases} \quad (20)$$

Following the same procedure as in the i.i.d. case of the SEC relaying scheme results in:

$$P_{out} = \frac{\left(1 - \exp\left(-\frac{\gamma_T}{\overline{\gamma}_k}\right)\right)^M}{(\overline{\gamma} - \overline{\gamma}_{S,D})}\left[\overline{\gamma}\exp\left(\frac{\gamma_T}{\overline{\gamma}}\right)\left(\exp\left(-\frac{\gamma_T}{\overline{\gamma}}\right) - \exp\left(-\frac{\gamma_{th}}{\overline{\gamma}}\right)\right) - \right. \quad (21)$$

$$\left.\overline{\gamma}_{S,D}\exp\left(\frac{\gamma_T}{\overline{\gamma}_{S,D}}\right)\times\left(\exp\left(-\frac{\gamma_T}{\overline{\gamma}_{S,D}}\right) - \exp\left(-\frac{\gamma_{th}}{\overline{\gamma}_{S,D}}\right)\right)\right] +$$

$$\sum_{j=0}^{M-1}\binom{M-1}{j}(-1)^j \frac{1}{\overline{\gamma} - (j+1)\overline{\gamma}_{S,D}}$$

$$\left[\frac{\overline{\gamma}}{(j+1)}\times\left(1 - \exp\left(-\frac{(j+1)\gamma_{th}}{\overline{\gamma}}\right)\right) - \overline{\gamma}_{S,D}\left(1 - \exp\left(-\frac{\gamma_{th}}{\overline{\gamma}_{S,D}}\right)\right) - \right.$$

$$\left.\exp\left(-\frac{(j+1)\gamma_T}{\overline{\gamma}}\right)\left\{\frac{\overline{\gamma}\exp\left(\frac{(j+1)\gamma_T}{\overline{\gamma}}\right)}{(j+1)}\times\right.\right.$$

$$\left.\left(\exp\left(-\frac{(j+1)\gamma_T}{\overline{\gamma}}\right) - \exp\left(-\frac{(j+1)\gamma_{th}}{\overline{\gamma}}\right)\right)\right) -$$

$$\left.\overline{\gamma}_{S,D}\exp\left(\frac{\gamma_T}{\overline{\gamma}_{S,D}}\right)\left(\exp\left(-\frac{\gamma_T}{\overline{\gamma}_{S,D}}\right) - \exp\left(-\frac{\gamma_{th}}{\overline{\gamma}_{S,D}}\right)\right)\right\}\right]$$

Following the same procedure as in the i.i.d. case of the SEC selection scheme, the BEP of the SECps relaying scheme can be evaluated as shown in equation (22).

Outage performance utilizing the present amplify and forward relay method for different values of outage threshold $\gamma_{th}$ at the optimum switching threshold $\gamma_{T\text{-}Opt}$ revealed that as $\gamma_{th}$ increases, the system performance becomes more degraded, as expected. SEC, and SEC+MRC schemes with optimal switching threshold $\gamma_{T\text{-}Opt}$ add gain to system performance compared with a no diversity case.

The number of relays M and the switching threshold $\gamma_T$ affect performance in that increasing M leads to a significant gain in system performance, specially, in the medium SNR region. On the other hand, as $\gamma_T$ becomes smaller or larger than the average SNR, the BEP improvement decreases asymptotically to the case of two relays. This is due to the fact that, if the average SNR is very small compared to $\gamma_T$, all the relays will be unacceptable most of the time. On the other hand, if the average SNR is very high in compared to $\gamma_T$, all the relays will be acceptable and one relay will be used most of the time. Thus, in both cases, the additional relays will not lead to any gain in system behavior.

$$P_b(E) = \left[1 - \left(1 - \exp\left(-\frac{\gamma_T}{\overline{\gamma}}\right)\right)^M\right] \quad (22)$$

$$\left\{\frac{1}{\left(1 - \frac{\overline{\gamma}}{\overline{\gamma}_{S,D}}\right)}\left(Q(\sqrt{2\gamma_T}) - \frac{\exp\left(\frac{\gamma_T}{\overline{\gamma}_{S,D}}\right)Q\left(\sqrt{2\left(\gamma_T + \frac{\gamma_T}{\overline{\gamma}_{S,D}}\right)}\right)}{\sqrt{1+\frac{1}{\overline{\gamma}_{S,D}}}}\right) + \right.$$

$$\frac{1}{\left(1 - \frac{\overline{\gamma}_{S,D}}{\overline{\gamma}}\right)}\left(Q(\sqrt{2\gamma_T}) - \frac{\exp\left(\frac{\gamma_T}{\overline{\gamma}}\right)Q\left(\sqrt{2\left(\gamma_T + \frac{\gamma_T}{\overline{\gamma}}\right)}\right)}{\sqrt{1+\frac{1}{\overline{\gamma}}}}\right) +$$

$$M\sum_{j=0}^{M-1}\binom{M-1}{j}(-1)^j \times \left[\frac{\left(1 - \sqrt{\frac{\overline{\gamma}_{S,D}}{1+\overline{\gamma}_{S,D}}}\right)}{2\left(j+1 - \frac{\overline{\gamma}}{\overline{\gamma}_{S,D}}\right)} + \right.$$

$$\frac{\left(1 - \sqrt{\frac{\overline{\gamma}}{j+1+\overline{\gamma}}}\right)}{2(j+1)\left(1 - (j+1)\frac{\overline{\gamma}_{S,D}}{\overline{\gamma}}\right)} -$$

$$\exp\left(\frac{-(j+1)\gamma_T}{\overline{\gamma}}\right)\left\{\frac{1}{\left(j+1 - \frac{\overline{\gamma}}{\overline{\gamma}_{S,D}}\right)} \times \right.$$

-continued $$\left(Q(\sqrt{2\gamma_T}) - \frac{\exp\left(\frac{\gamma_T}{\bar{\gamma}_{S,D}}\right)Q\left(\sqrt{2\left(\gamma_T + \frac{\gamma_T}{\bar{\gamma}_{S,D}}\right)}\right)}{\sqrt{1 + \frac{1}{\bar{\gamma}_{S,D}}}}\right) +$$

$$\frac{1}{(j+1)\left(1 - (j+1)\frac{\bar{\gamma}_{S,D}}{\bar{\gamma}}\right)}\left(Q(\sqrt{2\gamma_T}) - \frac{\exp\left(\frac{(j+1)\gamma_T}{\bar{\gamma}}\right)Q\left(\sqrt{2\left(\gamma_T + \frac{(j+1)\gamma_T}{\bar{\gamma}}\right)}\right)}{\sqrt{1 + \frac{(j+1)}{\bar{\gamma}}}}\right)$$

Simulations revealed that in a comparison between SEC, SECps, and best relay selection, SECps has nearly the same performance as the best relay selection for low SNR region. When the SNR increases, the error performance of the SECps scheme degrades and eventually becomes the same as that of SEC. This is expected, since when $\gamma_T$ is large in comparison with the average SNR, no relay will be acceptable and the SECps selection scheme will always select the best relay, just as in best relay selection scheme; whereas, when $\gamma_T$ is small compared to the average SNR, the SECps selection scheme works more like conventional SEC scheme. Moreover, comparison of the present method against popular existing protocols revealed, in the exemplary case of 4 relays, the number of active relays in the best relay and partial relay selection schemes is 4 all the time, whereas it is smaller in the case of the present scheme and depends on $\gamma_T$. In the worst case, it reaches 3. For channel estimations, in the case of the best and partial relay selection schemes, 4 and 8 channels are required to be estimated, respectively, whereas, it is lower in the present protocols, which reaches 6 at the worst case. This shows the significant reduction in system complexity the present method achieves.

The effect of the relay positions on the average BEP performance for different values of SNR was simulated. It is clear that in order to have best performance for this AF relay system; the two relays must be located midway between the source and the destination. In addition, as SNR increases, the system performance is more enhanced, as expected.

It is to be understood that the present invention is not limited to the embodiments described above, but encompasses any and all embodiments within the scope of the following claims.

We claim:

1. In a cooperative wireless relay network of nodes, the nodes including a source, a set of relays, and a destination, an amplify and forward relay method performed during concurrent direct and relay communication between the source and the destination, the amplify and forward relay method comprising the steps of:

arbitrarily selecting a first relay from the set of relays;
estimating a channel of the first arbitrarily selected relay;
comparing a minimum magnitude of two hops of a path of the first arbitrarily selected relay to a switching threshold, wherein the switching threshold is derived from an end-to-end (e2e) bit error probability (BEP) minimization, the BEP minimization being based on an average signal-to-noise ratio (SNR) of relay paths and direct link channels;
selecting the first arbitrarily selected relay path as a route for the communication between the source and the destination if the minimum magnitude exceeds the switching threshold;
combining signals of the direct path and the first arbitrarily selected relay path to enhance the concurrent direct and relay communication;
arbitrarily selecting a second relay from said set of relays if the first arbitrarily selected relay did not have a minimum magnitude exceeding said switching threshold, the second arbitrarily selected relay estimating its channels to be compared with said switching threshold;
continually arbitrarily selecting from the set of relays until a relay satisfying the switching threshold is found; and
combining signals of said direct path and said arbitrarily selected switching threshold satisfying relay's path to further enhance said concurrent direct and relay communication.

2. The amplify and forward relay method according to claim 1, further comprising the steps of:

determining whether the last relay reached satisfies said switching threshold;
selecting the best relay among all said relays in said set of relays when the last relay reached does not satisfy said switching threshold; and
combining signals of said direct path and said best relay's path to enhance said concurrent direct and relay communication.

* * * * *